(12) United States Patent
Kim

(10) Patent No.: US 9,783,945 B2
(45) Date of Patent: Oct. 10, 2017

(54) ROTARY TYPE DUST REMOVING MACHINE

(71) Applicant: DEOKSAN ENGINEERING CO., LTD., Jeongeup-si, Jeollabuk-do (KR)

(72) Inventor: Jae Sun Kim, Jeongeup-si (KR)

(73) Assignee: DEOKSAN ENGINEERING CO., LTD., Jeongeup-si (KR)

( * ) Notice: Subject to any disclaimer, the term of this patent is extended or adjusted under 35 U.S.C. 154(b) by 0 days.

(21) Appl. No.: 14/564,398

(22) Filed: Dec. 9, 2014

(65) Prior Publication Data

US 2015/0157966 A1 Jun. 11, 2015

(30) Foreign Application Priority Data

Dec. 10, 2013 (KR) ........................ 20-2013-0010271

(51) Int. Cl.
| | |
|---|---|
| *E03F 5/14* | (2006.01) |
| *E02B 8/02* | (2006.01) |
| *B01D 29/64* | (2006.01) |
| *B01D 29/44* | (2006.01) |
| *B01D 33/333* | (2006.01) |

(52) U.S. Cl.
CPC ............ *E02B 8/023* (2013.01); *B01D 29/445* (2013.01); *B01D 29/6484* (2013.01); *B01D 33/333* (2013.01); *E02B 8/026* (2013.01); *E03F 5/14* (2013.01); *C02F 2303/24* (2013.01)

(58) Field of Classification Search
CPC . E02B 8/023; E02B 8/026; E03F 5/14; B01D 29/44; B01D 29/445; B01D 29/6476; B01D 29/6484

USPC ................. 210/155, 159, 162, 413
See application file for complete search history.

(56) References Cited

U.S. PATENT DOCUMENTS

| | | | | |
|---|---|---|---|---|
| 452,702 A * | 5/1891 | Grabill | ...................... | E03F 5/14 210/155 |
| 2,128,348 A * | 8/1938 | Briggs | .................... | E02B 8/026 210/159 |
| 2,291,121 A * | 7/1942 | Tolman | ................... | E02B 8/026 210/162 |
| 3,190,448 A * | 6/1965 | Johnston | ................. | E02B 8/026 210/159 |
| 3,856,678 A * | 12/1974 | Hagihara | ................ | E02B 8/026 210/160 |
| 5,565,093 A * | 10/1996 | Frankenberger | ........ | E02B 8/026 210/158 |
| 7,547,389 B2 * | 6/2009 | Mellegard | ............... | E02B 8/026 210/159 |
| 2006/0037897 A1 * | 2/2006 | Jackson | .................. | E02B 8/026 210/159 |

FOREIGN PATENT DOCUMENTS

KR 10 2002 0092765 A 12/2002

* cited by examiner

*Primary Examiner* — Christopher Upton
(74) *Attorney, Agent, or Firm* — Novick, Kim & Lee, PLLC; Jae Youn Kim

(57) ABSTRACT

The present invention relates to a rotary screening apparatus, and more particularly, a rotary screening apparatus which is installed in an open channel such as drain pump station, water supply intake station, irrigation channel, sewage treatment plant and dam etc. to allow smooth removal of inclusion.

1 Claim, 2 Drawing Sheets

ROTARY TYPE DUST REMOVING MACHINE

This Application claims the benefit of foreign priority based on Korean Patent Application No. 20-2013-0010271 filed Dec. 10, 2013 with the Korean Intellectual Property Office, the contents of all of which are incorporated herein by reference in their entirety.

TECHNICAL FIELD

The invention relates to a rotary screening apparatus, and more particularly, a rotary screening apparatus which is installed in an open channel such as drainage pump station, water supply intake station, irrigation channel, sewage treatment plant and dam etc. to allow smooth removal of inclusion.

BACKGROUND ART

In general, a rotary screening apparatus is an apparatus installed in an open channel such as drain pump station, water supply intake station, irrigation channel, sewage treatment plant and dam etc. to continuously filter out and remove inclusion such as wood, plastic, home waste, weeds etc. which disrupts the operation of drain pump.

Korean Laid-Open Patent Application No. 10-2002-92765 discloses such a rotary screening apparatus.

However, such a prior screening apparatus has a problem that it cannot smoothly remove the inclusion flowing into between the apparatus and a bottom surface of a water treatment facilities.

Document of Prior Art

Patent Document 1: Korean Laid-Open Patent Application No. 10-2002-92765 (2002.12.12)

SUMMARY OF THE INVENTION

Technical Problems

The present invention was made in order to solve the above-mentioned problem, and its object is to provide a rotary screening apparatus which is installed in an open channel such as drainage pump station, water supply intake station, irrigation channel, sewage treatment plant and dam to allow smooth removal of the inclusion.

Problem to be solved by the present is not limited to the above-mentioned problem, and another problems not mentioned may be apparently understood by those skilled in the art from the following description.

Solution to the Problem

In order to achieve the above object, the present invention provide a rotary screening apparatus including a pair of guide frames which extend in an up-and-down direction and face each other; a screen which is provided between lower portions of the pair of guide frames; a front screen which includes a plurality of front screen units positioned below the screen; a driving part which is installed on a side of upper portion of the pair of guide frames; a driven part which is installed in the lower portion of the pair of guide frames; a belt part which includes a pair of chain belts for connecting the driving part and the driven part; and a plurality of rakes which rotate along with the belt part, wherein each of the plurality of front screen units includes a first front unit which has upper and lower end portions and extends in the directions of the upper and lower end portions and which is positioned in front of the screen; and a second front unit of which one end is connected to the lower end portion of the first front unit and of which the other end extends toward the rear of the guide frames and which is spaced from the belt part in an up-and-down direction.

The present invention provide a rotary screening apparatus including a pair of guide frames which extend in an up-and-down direction and face each other; a screen which is provided between lower portions of the pair of guide frames; a front screen which includes a plurality of front screen units positioned below the screen; a driving part which is installed on a side of upper portion of the pair of guide frames; a driven part which is installed in the lower portion of the pair of guide frames; a belt part which includes a pair of chain belts for connecting the driving part and the driven part; and a plurality of rakes which rotate along with the belt part, wherein the driven part includes a driven shaft which has two end portions rotatably fixed to the pair of guide frames; and a plurality of driven modules having a pair of second sprockets which are positioned between the pair of guide frames and coupled to the driven shaft and which lower portions of the pair of chain belts each engage.

Each of the plurality of front screen units according to the present invention includes a first front unit which has upper and lower end portions and extends in the directions of the upper and lower end portions and which is positioned in front of the screen; and a second front unit of which one end is connected to the lower end portion of the first front unit and of which the other end extends toward the rear of the guide frames and which is spaced from the belt part in an up-and-down direction.

Each of the plurality of front screen units according to the present invention includes further includes a third front unit which extends upwards from the other end of the second front unit.

The driven modules according to the present invention are provided in a pair and disposed in parallel in a front-and-back direction of the guide frames and thus a straight section is defined between the adjacent driven modules.

Effects of the Invention

According to the present invention, since the straight section is defined by the plurality of driven modules, the rakes passing through the straight section can easily carry away the inclusion accumulated between the straight section and the front screen while linearly moving.

Furthermore, since the lower portions of the pair of chain belts can be in a stable engagement with the plurality of driven modules, a phenomenon can be prevented that the belt part departs from the driven part on driving.

The effects of the present invention are not limited to those mentioned above, and another problem not mentioned may be apparently understood by those skilled in the art from the following description.

BEST MODES FOR CARRYING OUT THE INVENTION

Hereinafter, a preferred embodiment of the present invention will be described in more detail with reference to the attached drawings.

Figure 1:
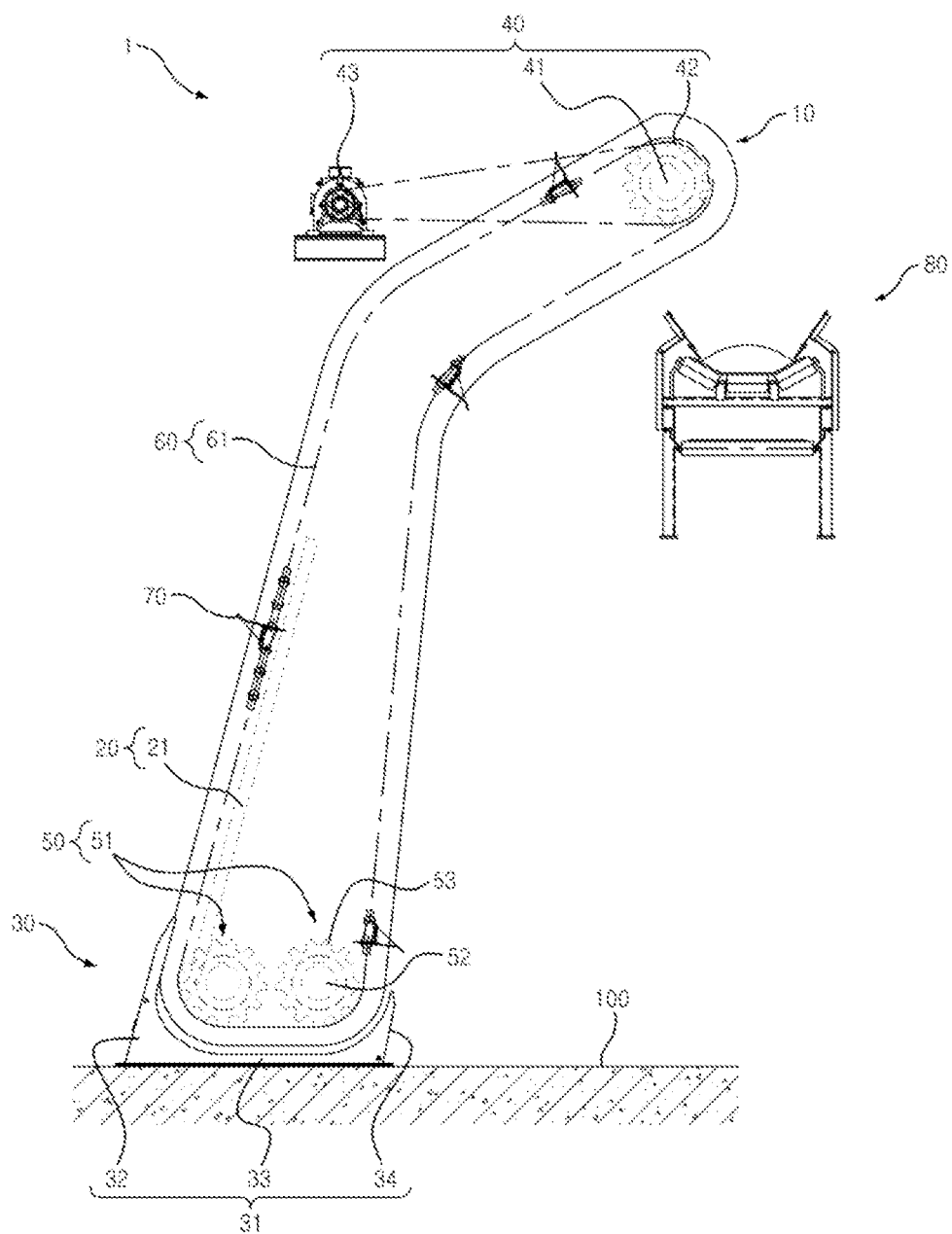
FIG. 1 is a side view of a rotary screening apparatus according to the present invention.
Figure 2:
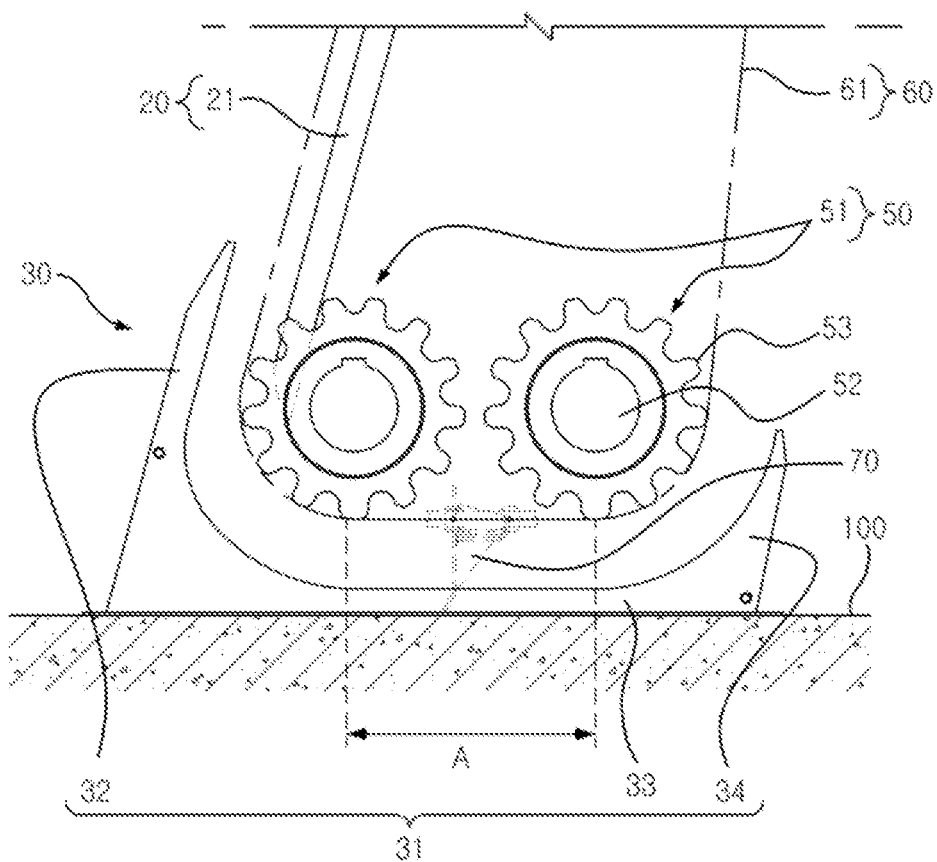
FIG. 2 is an enlarged partial side view of a front screen and a driven part in the rotary screening apparatus according to the present invention.

Referring to FIGS. 1 and 2, a rotary screening apparatus (1) of the present invention includes a pair of guide frames (10) which extend in an up-and-down direction and face each other; a screen (20) which is provided between lower portions of the pair of guide frames (10); a front screen (30) which includes a plurality of front screen units (31) positioned below the screen (20); a driving part (40) which is installed on a side of upper portion of the pair of guide frames (10); a driven part (50) which is installed in the lower portion of the pair of guide frames (10); a belt part (60) which includes a pair of chain belts (61) for connecting the driving part (40) and the driven part (50); and a plurality of rakes (70) which rotate along with the belt part (60), wherein each of the plurality of front screen units (31) includes a first front unit (32) which has upper and lower end portions and is positioned in front of the screen (20) and a second front unit (33) having both ends, one end of which is connected to a lower end portion of the first front unit (32) and the other end of which extends toward the rear of the guide frames.

In general, the rotary screening apparatus is installed in an open channel such as drain pump station, water supply intake station, irrigation channel, sewage treatment plant and dam to remove the inclusion such as wood, plastic, home waste, weeds etc. floating in the flowing water.

The screen (20) is installed with a certain angle relative to a bottom surface (100) of the open channel to filter out the inclusion carried by the flowing water, and includes a plurality of screen units (21) positioned at equal intervals between the pair of guide frames (10). Such a screen (20) is already known, and thus further detailed description thereof will be omitted.

The front screen (30) is positioned below the screen, and is fixed to and installed on an another separate structure, for example, the bottom surface (100) of the open channel.

The plurality of front screen units (31) are disposed in the same manner as the plurality of screen units (21) and block inflow of the inclusion into between the bottom surface (100) of the open channel and the screen (20).

A lower end portion of the first front unit (32) rests on the bottom surface (100) of the open channel and an upper end portion is inclined with a certain inclination toward the rear of the guide frames (10).

In the second front unit (33), both end portions thereof extend from the lower end portion of the first front unit (32) toward the rear of the guide frames (10), while a lower portion rests on the bottom surface (100) of the open channel, and an upper portion is spaced from the driven part (50) and the belt part (60) in an up-and-down direction when viewed from side.

The second front unit (33) decreases spacing between a trajectory section of the rakes (70) and the bottom surface (100) of the open channel while wrapping the driven part (50), thus allowing the inclusion to be smoothly transferred by the rakes (70).

In this connection, it is preferred that each of the front screen units (32) further includes a third front unit (34) extending upwards from the other end of the second front unit (33).

The third front unit (34) causes the inclusion that entered between the screen (20) and the front screen (30) to be accumulated without being discharged toward the rear of the pair of guide frames (10), and also decreases the spacing between the trajectory section of the rakes (70) and the bottom surface (100) of the open channel, thus allowing the inclusion to be smoothly transferred by the rakes (70).

To this end, it is preferred that, in the each of the plurality of front screen units (31), an upper surface where the first and second front units (32, 33) abut against each other and an upper surface where the second and third front units (33, 34) abut against each other are curved. Namely, each of the plurality of front screen units (31) has a "U"-shape with its top portion open, due to integral connection of the first, second and third front units (32, 33, 34).

In the rotary screening apparatus (1), discharge of the inclusion can be guided along with movement of the rakes (70) since the upper surface of each of the plurality of front screen units (31) is curved.

Furthermore, the rotary screening apparatus (1) allows smooth inflow and recovery of the inclusion since the upper surface of each of the plurality of front screen units (31) is curved along the trajectory section of the rakes (70).

The driving part (40) has a driving shaft (41) which has two ends rotatably fixed to the pair of guide frames (10); a pair of first sprockets (42) which are positioned inside the pair of guide frames (10) and coupled to the driving shaft (41) and which upper portions of the pair of chain belts (61) each engage; and a driving motor (43) which supplies a torque to the driving shaft (41).

A plurality of the rakes (70) recover and transport the inclusion filtered by the screen (20) while being rotated along with the belt part (60) by the drive of the driving part (40).

The rotary screening apparatus (1) may further include a conveyor (80) for receiving and discharging outwards the inclusion which is recovered and dropped by the plurality of rakes (70).

The driven part (50) includes a plurality of driven modules (51), each having (i) a driven shaft (52) which has two ends rotatably fixed to the pair of guide frames (10), and (ii) a pair of second sprockets (53) which are positioned inside the pair of guide frames (10), coupled to the driven shaft (52), and engaged by lower portions of the pair of chain belts (61).

In conventional rotary screening apparatuses, a phenomenon may frequently occur that a lower portion of driven part engages a single driven module and thus departs from the driven module on driving.

The plurality of driven modules (51) are disposed in parallel in a front-and-back direction of the guide frames (10), and thus a straight section (A) parallel with the plurality of front screen units (31) is defined between the adjacent driven modules (51). Herein, it is preferred that the plurality of driven modules (51) are positioned above the second front unit (33) when viewing the rotary screening apparatus (1) from side.

Namely, the straight section (A) and the second front screen unit (33) are approximately parallel with each other, and the rake (70) carries away the inclusion accumulated between the straight section (A) and the front screen (30) while linearly moving in the straight section (A).

In this way, in the rotary screening apparatus (1), since the straight section (A) is defined by the plurality of driven modules (51), the rakes (70) passing through the straight section (A) can easily carry away the inclusion accumulated between the straight section and the second front screen (33) while linearly moving.

Furthermore, in the rotary screening apparatus (1), lower portions of the pair of chain belts (61) can be in a stable engagement with the plurality of driven modules (51), and thus the phenomenon can be prevented that the belt part (60) departs from the driven part (50) on driving.

The above description is merely embodiment for implementing the rotary screening apparatus according to the present invention. The present invention is not limited to the embodiment described above, and various modifications may be made by those skilled in the art without departing from the gist of the present invention as defined by the scope of the following claims.

DESCRIPTION OF REFERENCE NUMERALS

1: rotary screening apparatus
10: guide frame
20: screen
21: screen unit
30: front screen
31: front screen unit
40: driving part
41: driving shaft
42: first sprocket
43: driving motor
50: driven part
51: driven module
52: driven shaft
53: second sprocket
60: belt part
70: rake
80: conveyor
A: straight section

What is claimed is:

1. A rotary screening apparatus, comprising:
a pair of guide frames that extend in an up-and-down direction and face each other;
a screen including a plurality of screen units positioned at equal intervals between lower portions of the pair of guide frames;
a front screen that includes a plurality of front screen units positioned below the screen and disposed in the same manner as the plurality of screen units;
a driving part installed at upper portions of the pair of guide frames;
a driven part installed at the lower portions of the pair of guide frames;
a belt part that includes a pair of chain belts for connecting the driving part and the driven part; and
a plurality of rakes that rotate along with the belt part, wherein:
each of the plurality of front screen units comprises:
a first front unit that has upper and lower end portions positioned in front of the screen;
a second front unit, (i) one end of which is connected to the lower end portion of the first front unit, (ii) the other end of which extends toward the rear of the pair of guide frames, and (iii) which is spaced from the belt part in an up-and-down direction; and
a third front unit that extends upwards from the other end of the second front unit,
the first, second and third front units are integrally connected and thus each of the plurality of front screen units has a "U" shape with its top portion open,
the driven part comprises a pair of driven modules, each having (i) a driven shaft that has two end portions rotatably fixed to the pair of guide frames, and (ii) a pair of second sprockets that are positioned between the pair of guide frames, coupled to the driven shaft, and engaged by lower portions of the pair of chain belts,
the pair of driven modules are disposed in parallel in a front-and-back direction of the pair of guide frames, thus defining a straight section between the adjacent driven modules,
an upper surface of the second front unit is parallel with the straight section, and
an upper surface where the first and second front units abut against each other and an upper surface where the second and third front units abut against each other are curved and adjacent to the pair of driven modules.

* * * * *